(12) United States Patent
Frost et al.

(10) Patent No.: US 11,093,491 B2
(45) Date of Patent: Aug. 17, 2021

(54) QUESTION ANSWERING SYSTEM USING TOPIC-SENSITIVE SOURCE RELIABILITY SCORING

(71) Applicant: International Business Machines Corporation, Armonk, NY (US)

(72) Inventors: Keith Gregory Frost, Delaware, OH (US); Stanley John Vernier, Grove City, OH (US); Kyle Matthew Brake, Dublin, OH (US); Stephen Arthur Boxwell, Franklin, OH (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 297 days.

(21) Appl. No.: 16/249,032

(22) Filed: Jan. 16, 2019

(65) Prior Publication Data

US 2020/0226135 A1 Jul. 16, 2020

(51) Int. Cl.
*G06F 16/2452* (2019.01)
*G06F 16/248* (2019.01)
*G06F 16/2457* (2019.01)

(52) U.S. Cl.
CPC ...... *G06F 16/24522* (2019.01); *G06F 16/248* (2019.01); *G06F 16/24578* (2019.01)

(58) Field of Classification Search
CPC .............. G06F 16/3329; G06F 16/248; G06F 16/24522; G06F 16/24578; G06N 5/00
USPC ....................................................... 707/723
See application file for complete search history.

(56) References Cited

U.S. PATENT DOCUMENTS

| | | | |
|---|---|---|---|
| 5,519,608 A * | 5/1996 | Kupiec | G06F 16/3329 707/669 |
| 9,240,128 B2 | 1/2016 | Bagchi et al. | |
| 9,400,841 B2 | 7/2016 | Eggebraaten et al. | |
| 9,529,894 B2 | 12/2016 | Nolan et al. | |
| 9,697,477 B2 | 7/2017 | Oh et al. | |
| 2003/0005258 A1* | 1/2003 | Modha | G06K 9/6228 712/1 |
| 2012/0284349 A1* | 11/2012 | Robinson | H04L 51/043 709/206 |
| 2013/0159116 A1* | 6/2013 | Gross | G06F 16/951 707/706 |
| 2013/0346356 A1* | 12/2013 | Welinder | G06F 16/215 706/52 |
| 2014/0298199 A1* | 10/2014 | Johnson, Jr. | H04L 65/403 715/753 |

(Continued)

*Primary Examiner* — Shahid A Alam
(74) *Attorney, Agent, or Firm* — Cantor Colburn LLP; David Mattheis

(57) ABSTRACT

Embodiments of the present invention are directed to a computer-implemented method for determining topic specific reliability for a question answering system. A non-limiting example of the computer-implemented method includes receiving a topic specific input query by the question answering system. The method further includes detecting a source that provides a reference containing the ground truth answers to the ground truth questions. The method further includes traversing sources detect similar references in other sources and assigning reliability scores for each source based upon ground truth answers in the other sources. The method further includes providing a ranked list of answers based upon the reliability of each source upon for each answer.

20 Claims, 3 Drawing Sheets

(56) References Cited

U.S. PATENT DOCUMENTS

2017/0046623 A1* 2/2017 Murdock, IV ......... G09B 19/06

* cited by examiner

QUESTION ANSWERING SYSTEM USING TOPIC-SENSITIVE SOURCE RELIABILITY SCORING

BACKGROUND

The present invention generally relates to a question answering (QA) system, and more specifically, to a question answering system using topic-sensitive source reliability scoring.

QA systems, in response to an input query, perform a primary search to retrieve documents, passages, and other types of information from a corpus of data. Candidate answers are generated and evaluated with respect to the probability that their respective content supports or refutes the input query. Passages are scored using various techniques to judge the candidate documents, passages, and other information independent of one another. An example of a QA system is the IBM Watson™ system available from International Business Machines (IBM) Corporation of Armonk, N.Y.

SUMMARY

Embodiments of the present invention are directed to a computer-implemented method for determining topic specific reliability for a question answering system. A non-limiting example of the computer-implemented method includes receiving an input query from a question answering system. The method further includes receiving a topic-specific input query by the question answering system. The method further includes creating a document containing set of ground truth questions and ground truth answers that are related to the topic. The method further includes detecting a source that provides the ground truth answers to the ground truth questions, wherein the ground truth answers are contained in at least one reference. The method further includes traversing sources in a first corpus of data to detect references similar to the at least one reference. The method further includes assigning reliability scores for each source with respect to the topic by evaluating answers provided by each source to the set of ground truth questions. The method further includes generating a set candidate answers to the input query from the first corpus of data. The method further includes evaluating the set of candidate answers by comparing the answers from the first corpus of data to answers found in sources in a second corpus of data. The method further includes providing a ranked list of answers, wherein the ranking is based upon the reliability of each source from the first corpus of data relied upon for each answer, wherein the ground truth questions and ground truth answers originate externally from the first corpus of data and the second corpus of data.

Embodiments of the present invention are directed to a question answering system that determines topic specific reliability of data sources. A non-limiting example of the system includes a processor communicatively coupled to a memory. The processor is configured to perform the above-described method.

Embodiments of the invention are directed to a computer program product for determining topic specific reliability of data sources for a question answering system, the computer program product comprising a computer readable storage medium having program instructions embodied therewith. The program instructions are executable by a processor to cause the processor to perform the above-described method.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
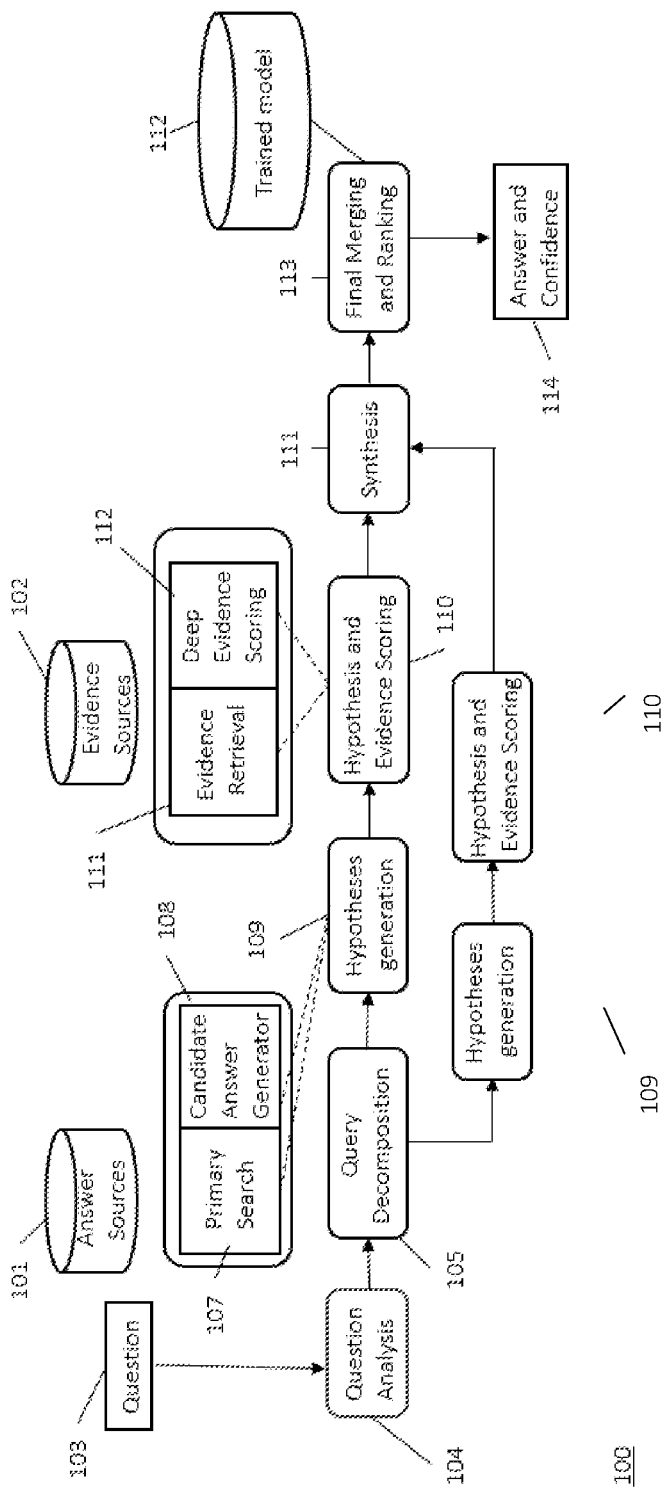
FIG. 1 depicts a block diagram of an example question answering systems for use in implementing one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As referenced herein, the term "corpus," "database," or "knowledge base" is defined as a collection of structured (e.g., facts mined from the Web or pre-existing databases), semi-structured (e.g., Wikipedia), or unstructured data (e.g., typical web pages and blog posts). Although referred in the singular form, the database may include one or more databases, and may be locally stored on a system or may be operatively coupled to a system via a local or remote network.

As used herein, the term "communicatively coupled" means capable of sending and/or data over a communication link. The communication link may include both wired and wireless links, and may be a direct link or may comprise multiple links passing through one or more communication network devices such as, but not limited to, routers, firewalls, servers, and switches. The network device may be located on various types of networks such as local-area networks (LANs), wide-area networks (WANs), and metropolitan-area networks (MANs). The networks may include private networks and/or public networks such as the Internet. Additionally, in certain embodiments, communication links may also encompass internal communication between various components of a system and/or with an external input/output device such as a keyboard or display device.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Embodiments of the present disclosure are directed towards a QA system configured to evaluate the reliability of different sources with respect to a particular topic. In a conventional QA system, candidate answers can be generated in response to an input query. The QA system can be configured to receive an input query, analyze one or more data sources for reliability, and generate answers to the input query. Answers can be provided to the person inputting the query in various forms including, but not limited to, textual data, images, and video or audio files. For example, the QA system could receive an input query asking how to repair a particular household appliance. The QA system can generate an answer or a set of answers that describe a set of instructions repairing the appliance. Additionally, the QA system can provide a listing of service providers that repair said appliance. The system could further rank the display of the answers and provide reviews for each service provider. The answers are provided based upon a score of a confidence value associated with the answer. The QA system can be configured to provide a display that shows the answers in terms of a descending order of confidence value of each answer.

QA systems are useful for providing answers to professional and casual inquiries. However, the efficacy of QA systems is intertwined with the reliability of the sources documents used to generate the answers. Sources themselves derive their content from various sub-sources (e.g. different authors) and the sub-sources may have a more in-depth acumen with respect to one topic than another. Additionally, even understanding this, determining a criteria to distinguish a reliable source from an unreliable source on a per topic basis is difficult.

Some sources are particularly reliable on certain topics, but might be unreliable on other topics. Therefore, it is desirable that a QA system filters or weights passages and answers based on the reliability of the source documents for a particular topic. Other methods can also be used to weight documents, sources, and answers that are derived from them. However, conventional methods of assigning a single reliability score to a source risk unduly penalizing sources on topics on which they are authoritative.

Embodiments of the present invention provide systems and methods for determining the reliability of a source based upon a particular topic. A source includes a new outlet, an individual blogger, website, or any other separable source of information. Grounds truths for each topic in a source are determined to identify the reliability of the source per topic. The reliability of each source can be determined based upon the correlation between the answers provided by a particular source and a set of ground truth answers. Therefore, a QA system can search sources based not only on the reliability of a source but upon a particular topic.

Referring to FIG. 1, a block diagram of an example question answering system 100 that may be used in the context of various embodiments of the invention is shown. The QA system 100 can be implemented to accept a question (input query) 103 and generate a ranked list of answers 114 along with a confidence score associated with each answer.

FIG. 1 generally describes the various stages of analysis in a parallel input query processing pipeline. Initially, the QA system receives an input query/question from a computing device (not shown). The QA system 100 determines the appropriate answer sources 101 and evidence sources 102. The answer sources 101 and evidence sources 102 are each a corpus of data comprising a variety of sources. In some embodiments, the evidence sources and answer sources are distinct from one another. In order to accomplish this, the QA system 100 analyzes the question 104 by decomposition 105. Decomposition can be performed by various techniques that search for results including, but not limited to parses, semantic role labels, co-references, and relationships. The QA system 100 can further use statistical methods to determine the best method to decompose the question.

Figure 2:
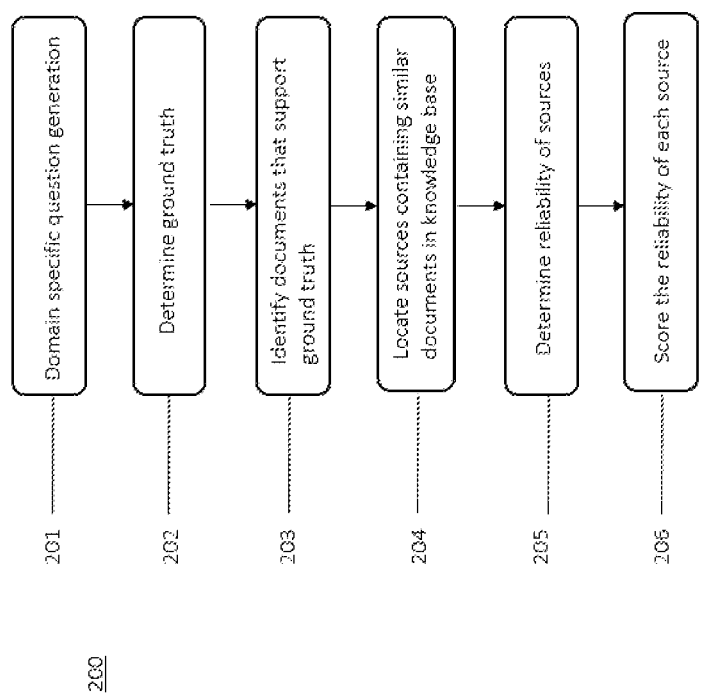
FIG. 2 is a flowchart of a computer-implemented method for adjusting source reliability for use in implementing one or more embodiments of the present invention.

The answer sources 101 and the evidence sources 102 can be vetted for reliability, as further described in FIG. 2. A set of topic-specific questions are generated with respect to a source. These questions are used to establish a set of answers contained in ground truth documents. Using the ground truth documents, sources containing similar documents are uncovered from the remaining corpus. In order to determine the reliability of the sources, these sources are subjected to the same specific questions as the ground truth documents. The reliability of the sources is based upon a similarity between the answers provided by the "ground truth" documents and the similar documents.

Hypotheses are generated 109 using data from the question decomposition 105 and data obtained from a primary search 107. A primary search 107 is a search for candidate answers, and each chosen candidate answers is considered to be a hypothesis. Various methods can be employed to find candidate answers including employing multiple methods and searching multiple sources. For example, the QA system 100 can use various scoring algorithms to generate the candidate answers from the answer source. A scoring algorithm can detect matching terms and synonyms within the language of the input query and the portions of the sources in the answer source 101. Other scoring algorithms can detect temporal or spatial features in the language of the input query.

Candidate answers are further evaluated and scored through various statistical methods 110 by retrieving additional evidence 111 from the evidence sources 102. Deep learning analytics 112 are applied to evaluate the additional evidence sources 102. The scoring analytics provide a probability value with respect to the level of support the additional evidence supports the candidate answers. The process can be repeated until a predetermined level of confidence is reached for the candidate answers.

A synthesis 111 is performed of the results of the hypothesis and evidence scorings 110. A trained model or models 112 can then be applied to the output of the synthesis 111 to generate a final merging and ranking 113. A ranked list of answers with associated confidence levels 114 can be output to the device or other devices.

FIG. 2 depicts a flow diagram of a method 200 for determining the reliability of sources according to one or more embodiments of the invention. The method 200 includes compiling a respective set of questions and answers for specific topics 201. These sets of questions can be supervised or unsupervised. If the questions are supervised, a human curator creates and separates sets of specific questions for each topic in a source. If the questions are unsupervised, they can be separated by a computer-based method using clustering algorithms. The questions can be stored in a question database or bank and retrieved based upon to the input query. If the input query suggests more than one topic, more than one set of questions can be retrieved.

A topic-specific set of questions is propounded upon a source known for reliability in the topic. A set of answers that correlate an accepted truth to the set of questions for each topic are identified 202. If a document-based ground truth is being established, documents that provide the answers established by the ground truth can be identified 203. The accepted truth can be determined by the human curator or by the system using various computer-based techniques. Sources can be removed or disabled from the answer source or the evidence source for a particular topic if they fail to reach a threshold value of reliability. In this fashion, a QA system does expend resources searching an unreliable source. Additionally, if no source achieved, the QA system can seek out additional sources until a source with reaching a threshold value of reliability is found. The QA system can become iteratively more efficient by remembering that certain sources do not need to be searched for candidate answers for certain topics.

The sources in a knowledge base are traversed to determine which sources contain topic-specific answers or documents similar to the respective ground truth answers or documents 204. The similarity between documents can be determined by various methods including, but not limited to a term frequency-inverse document frequency (TF-IDF) comparison with the similar documents, bag-of-words modeling, metadata-based filtering, or other various clustering techniques. Once similar documents have been identified, the source can be subjected to the topic-specific set of questions to determine the reliability of the source. The sources are then scored based upon a reliability with respect to each topic. Once the reliability scores have been determined, the scores can be paired with question classification to create new answer scores. Answers can be promoted or demoted based upon the reliability of the source documents.

Additional processes may also be included. It should be understood that the processes depicted in FIG. 2 represent illustrations, and that other processes may be added or existing processes may be removed, modified, or rearranged without departing from the scope and spirit of the present disclosure.

As an example, a sports website may be considered a reliable source for sports-related information. However, in the course of generating content for the site, writers may have included content regarding medical issues that athletes are facing. In this respect, questions related to medical issues can be propounded upon the website. It would be expected that the site would not score well as reliable for medical issues. Therefore, in response to a medical issue related input query this website would be downgraded by a QA system as a reliable source for answers. However, the website would still score as reliable as to sports-related queries.

Figure 3:
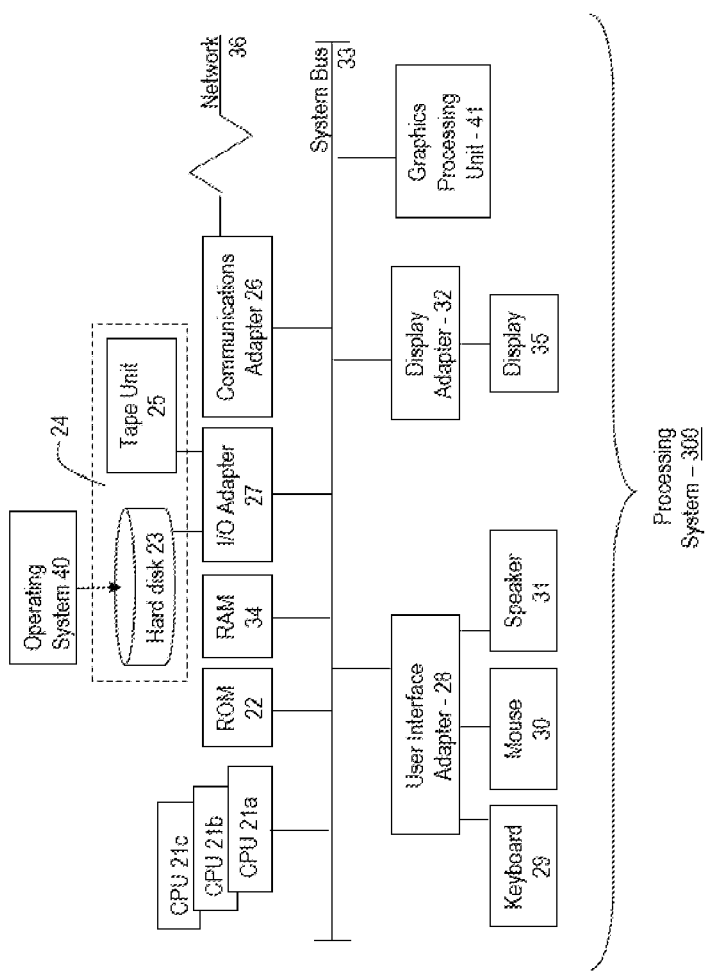
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

The system runs on a processor or processors 21. The operating system coordinates and provides control of various components within the processing system 300. Non-limiting examples of operating systems include the Advanced Interactive Executive (AIX®) operating system or the Linux® operating system. Various applications and services may run in conjunction with the operating system. For example, in one embodiment, International Business Machines (IBM)® DeepQA software, which is designed for information retrieval that incorporates natural language processing and machine learning, is executed on data processing system 300.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for providing a topic reliability score to a question answering system, the method comprising:
    receiving a topic specific input query by the question answering system;
    creating a ground truth document containing ground truth questions and ground truth answers that are related to the topic;
    determining a source that provides the ground truth answers to the ground truth questions by propounding the ground truth questions upon the source and determining whether answers received from the source correlate to the ground truth answers;
    traversing sources in a first corpus of data to detect references similar to the at least one reference;
    assigning reliability scores for each source with similar references by evaluating answers provided by each source to the ground truth questions;
    generating a set of candidate answers to the input query from the first corpus of data;
    evaluating the set of candidate answers by comparing the answers from the first corpus of data to answers found in sources in a second corpus of data; and
    providing a ranked list of answers, wherein the ranking is based upon the reliability score of each source from the first corpus of data relied upon for each answer,
    wherein the ground truth questions and ground truth answers originate externally from the first corpus of data and the second corpus of data.

2. The computer-implemented method of claim 1, wherein locating similar references comprises employing at least one of a term frequency-inverse document frequency (TF-IDF) method, bag-of-words modeling, metadata-based filtering, and a clustering method.

3. The computer-implemented method of claim 1 further comprising scoring the candidate answers based upon matching terms and synonyms within a language of the input query and portions of the sources in the first corpus.

4. The computer-implemented method of claim 1 further comprising scoring the candidate answers based upon temporal or spatial features in a language of the input query.

5. The computer-implemented method of claim 1, wherein the second corpus of data is distinct from the first corpus of data.

6. The computer-implemented method of claim 1, wherein the ground truth questions and ground truth answers are received from a question bank.

7. The computer-implemented method of claim 6 further comprising separating the ground truth questions and ground truth answers questions using a clustering method.

8. The computer-implemented method of claim 6 further comprising separating topics of the ground truth questions and ground truth answers by a manual input.

9. The computer-implemented method of claim 6, wherein the question bank is distinct from the first corpus of data and the second corpus of data.

10. A question answering system comprising:
    a processor communicatively coupled to a memory, the processor configured to:
    receiving a topic specific input query by the question answering system;
    creating a ground truth document containing ground truth questions and ground truth answers that are related to the topic;
    determining a source that provides the ground truth answers to the ground truth questions by propounding the ground truth questions upon the source and determining whether answers received from the source correlate to the ground truth answers;
    traversing sources in a first corpus of data to detect references similar to the at least one reference;
    assigning reliability scores for each source with similar references by evaluating answers provided by each source to the set of ground truth questions;
    evaluating a set of candidate answers by comparing the answers from the first corpus of data to answers found in sources in a second corpus of data; and
    providing a ranked list of answers, wherein the ranking is based upon the reliability score of each source relied upon for an answer,
    wherein the ground truth questions and ground truth answers originate externally from the first corpus of data and the second corpus of data.

11. The question answering system of claim 10, wherein locating similar references comprises employing a term frequency-inverse document frequency (TF-IDF) method, bag-of-words modeling, metadata-based filtering, or a clustering method.

12. The question answering system of claim 10 further comprising scoring the candidate answers based upon matching terms and synonyms within a language of the input query and portions of the sources in the first corpus.

13. The question answering system of claim 10 further comprising scoring the candidate answers based upon temporal or spatial features in a language of the input query.

14. The question answering system of claim 10, wherein the second corpus of data is distinct from the first corpus of data.

15. The question answering system of claim 10, wherein the ground truth questions and ground truth answers are received from a question bank.

16. The question answering system of claim 15 further comprising separating the ground truth questions and ground truth answers questions using a clustering method.

17. The question answering system of claim 15 further comprising separating topics of the ground truth questions and ground truth answers by a manual input.

18. The question answering system of claim 15, wherein the question bank is distinct from the first corpus of data and the second corpus of data.

19. A computer program product for providing a topic reliability score to a question answering system, the computer program product comprising a computer readable storage medium having program instructions embodied therewith, the instructions executable by a processor to cause the processor to:

receive a topic specific input query by the question answering system;

create a ground truth document containing ground truth questions and ground truth answers that are related to the topic;

determine a source that provides the ground truth answers to the ground truth questions by propounding the ground truth questions upon the source and determining whether answers received from the source correlate to the ground truth answers;

traverse sources in a first corpus of data to detect references similar to the at least one reference;

assign reliability scores for each source with similar references by evaluating answers provided by each source to the set of ground truth questions;

evaluate a set of candidate answers by comparing the answers from the first corpus of data to answers found in sources in a second corpus of data; and provide a ranked list of answers, wherein the ranking is based upon the reliability score of each source relied upon for an answer, wherein the ground truth questions and ground truth answers originate externally from the first corpus of data and the second corpus of data.

20. The computer program product of claim 19, wherein locating similar documents comprises employing a term frequency-inverse document frequency (TF-IDF) method, bag-of-words modeling, metadata-based filtering, or a clustering method.

* * * * *